United States Patent
Kiji et al.

(10) Patent No.: US 7,921,562 B2
(45) Date of Patent: Apr. 12, 2011

(54) WELDING METHOD AND STEEL PLATE DECK

(75) Inventors: Noboru Kiji, Hiroshima (JP); Masashi Fujiwara, Yokohama (JP); Tsutomu Matsuoka, Kuwana (JP); Shigeki Nishiyama, Fujisawa (JP); Makoto Ota, Fujisawa (JP)

(73) Assignees: Ihi Corporation (JP); Kabushiki Kaisha Kobe Seiko Sho (JP)

( * ) Notice: Subject to any disclaimer, the term of this patent is extended or adjusted under 35 U.S.C. 154(b) by 196 days.

(21) Appl. No.: 12/147,712

(22) Filed: Jun. 27, 2008

(65) Prior Publication Data

US 2009/0019809 A1   Jan. 22, 2009

(30) Foreign Application Priority Data

Jul. 17, 2007  (JP) ................. 2007-186047

(51) Int. Cl.
*B21D 47/00*   (2006.01)
*E04C 2/32*    (2006.01)

(52) U.S. Cl. ... 29/897; 29/897.3; 29/897.31; 29/897.32; 52/783.11; 52/783.14; 52/783.17; 52/783.19; 52/741.1; 52/746.1

(58) Field of Classification Search .............. 29/840, 29/860, 878–880, 888.091, 888.092, 890.126, 29/890.132, 402.16, 402.12, 402.13, 890.039, 29/890.12, 897.3, 897.31, 897.312, 897.32, 29/897, 897.15, 898.07; 52/840, 783.11, 52/783.7, 783.19, 798.1, 745.07, 783.14; 219/121.64

See application file for complete search history.

(56) References Cited

U.S. PATENT DOCUMENTS

| | | | | |
|---|---|---|---|---|
| 1,842,612 A * | 1/1932 | Kahn | ............... | 52/694 |
| 2,624,430 A * | 1/1953 | Macomber | ............... | 52/694 |
| 2,662,272 A * | 12/1953 | Macomber | ............... | 29/897.31 |
| 3,173,193 A * | 3/1965 | Grebner et al. | ............... | 29/897.31 |
| 3,300,854 A * | 1/1967 | Jackson et al. | ............... | 29/527.2 |
| 3,454,396 A * | 7/1969 | Sowman et al. | ............... | 419/7 |
| 3,882,654 A * | 5/1975 | Yancey | ............... | 403/271 |
| 3,961,738 A * | 6/1976 | Ollman | ............... | 228/5.1 |
| 4,241,146 A * | 12/1980 | Sivachenko et al. | ............... | 428/600 |
| 4,966,082 A * | 10/1990 | Takeichi et al. | ............... | 105/422 |
| 5,007,225 A * | 4/1991 | Teasdale | ............... | 52/783.17 |
| 5,538,177 A * | 7/1996 | Takahashi | ............... | 228/196 |
| 5,551,135 A * | 9/1996 | Powers, III | ............... | 29/6.1 |
| 5,635,306 A * | 6/1997 | Minamida et al. | ............... | 428/593 |
| 2004/0197519 A1* | 10/2004 | Elzey et al. | ............... | 428/68 |

(Continued)

FOREIGN PATENT DOCUMENTS

JP    06-079454    3/1994

(Continued)

OTHER PUBLICATIONS

Written Opinion issued Feb. 10, 2009 in corresponding Japanese application PCT/JP2008/056558 (4 pages).

(Continued)

*Primary Examiner* — Jeanette E. Chapman
(74) *Attorney, Agent, or Firm* — Ostrolenk Faber LLP

(57) ABSTRACT

A method of welding a deck plate and a closed section rib both constituting a steel plate deck, comprising: working a root portion of the closed section rib to have a flat surface in parallel with a surface of the deck plate; and welding the deck plate and the closed section rib while making the flat surface of the closed section rib to be in contact with the surface of the deck plate.

4 Claims, 5 Drawing Sheets

U.S. PATENT DOCUMENTS

2010/0115881 A1 * 5/2010 Inose et al. ............. 52/783.14

FOREIGN PATENT DOCUMENTS

| | | |
|---|---|---|
| JP | H08-281476 | 10/1996 |
| JP | 09-314374 | 12/1997 |
| JP | 2001-248114 | 9/2001 |
| JP | 2003-080396 | 3/2003 |
| JP | 2003-183769 | 7/2003 |
| JP | 2006-224137 | 8/2006 |

OTHER PUBLICATIONS

International Search Report in corresponding Japanese Application No. PCT/JP2008/056558 dated Jun. 12, 2006.

* cited by examiner

WELDING METHOD AND STEEL PLATE DECK

BACKGROUND OF THE INVENTION

1. Field of the Invention

The present invention relates to a method of welding and a steel plate deck.

Priority is claimed on Japanese Patent Application No. 2007-186047, filed Jul. 17, 2007, the content of which is incorporated herein by reference.

2. Description of Related Art

A steel plate deck is known as a flooring material used for buildings such as bridges. A steel plate deck is constituted of a deck plate (steel plate) and a plurality stiffeners (ribs) arranged on the deck plate, and the deck plate and the ribs are integrated with each other by longitudinal welding (Japanese Unexamined Patent Application, First Publication, No. 2003-183769; Japanese Unexamined Patent Application, First Publication, No. H08-281476; Japanese Unexamined Patent Application, First Publication, No. 2003-080396). Closed-section ribs, steel members having V-shaped or U-shaped closed sections are known as examples of the ribs. In the welding of the closed-section ribs and deck plate, an amount of penetration of the weld zone is required to be not less than 75% of the plate thickness of the ribs. In some cases, the amount of penetration of the weld zone is required to be not less than 80% of the plate thickness of the ribs.

Full-penetration welding using a backing metal, gas-shielded metal arc welding, and submerged arc welding are generally known methods of welding. Particularly, full-penetration welding is known as an effective method in that a high amount of penetration is stably ensured.

On the other hand, in the case of welding of a deck plate and a closed section rib, it is difficult to perform full-penetration welding since the structure of the closed-section ribs makes it difficult to use a backing metal. Therefore, gas-shielded metal arc welding, submerged arc welding or the like have conventionally been used in the welding of the deck plate and the closed-section rib. In such methods, welding is performed while edges of the closed section ribs are made to contact the deck plate. A portion of an edge of each rib, which is made to contact the deck plate, is called a root portion.

In general, the edge of the rib has a root portion which is cut to have an orthogonal or nearly orthogonal angle. Therefore, when the edge of the rib is made to contact the deck plate, only the root portion is in contact with the deck plate, forming a clearance (groove) corresponding to a setting angle between the deck plate and the edge of the rib.

When the welding is performed in that state, there is a case in which molten slag generated during the welding intrudes into the groove. In addition, blowholes are easily formed by the gas generated during the welding. When the molten slag and the blowholes generated during the welding intrude to an extent deeper than the target amount of penetration, the molten slag and blowholes remain in those states. The residual slag and blowholes cause slag inclusion and/or insufficient amount of penetration.

Japanese Unexamined Patent Application, First Publication No. H08-281476 describes a flux cored wire for gas-shielded metal arc welding. By means of the limited composition of the wire, it is possible to obtain a bead for providing satisfactory form and appearance of the weld zone. Japanese Unexamined Patent Application, First Publication No. 2003-80396 describes a technique for obtaining a deep penetration by limiting the filling factor of the flux in addition to the limitation of the composition of the wire. However, there are still problems in that the slag inclusion in the root portion cannot be completely prevented, and a stable penetration cannot be achieved.

In a technique proposed as a solution for these problems, generation of the above-described defects is avoided by increasing the amount of penetration such that the melting proceeds to a position deeper than the position of intrusion of the molten slag and the blowholes. However, the increased amount of penetration sometimes results in excessive melting that reaches the back surface (inner surface of the U-shaped member) of the closed section ribs, thereby making it difficult to control a stable amount of penetration, and causing unstable forms of beads.

SUMMARY OF THE INVENTION

An object of the present invention is to provide a welding method which enables a stable amount of penetration while inhibiting generation of residual molten slag. Another object of the present invention is to provide a steel deck plate.

A welding method according to the present invention is a method of welding a deck plate (steel plate) and a closed section rib that constitute a steel plate deck, including shaping a root portion of the closed section rib to have a flat surface in parallel with a surface of the deck plate, and welding the deck plate and the closed section rib while making the flat surface of the closed section rib to contact the surface of the deck plate.

In the above-described method of welding, the root portion at the rib edge of the closed section rib has a flat surface, and the deck plate and the rib are welded in a state such that the flat surface of the closed section rib is made to contact the surface of the deck plate. Therefore, intrusion of the molten slag and blowholes is limited to the position bordered by the contact portion, and the molten slag and the blowholes are eliminated by the molten metal. As a result, it is possible to prevent the generation of residual molten slag and blowholes without increasing the amount of penetration, and to ensure a stable amount of penetration. In addition, since the amount of penetration can be controlled by controlling the dimension of the flat surface, it is possible to suppress any change in the amount of penetration caused by a change in the welding conditions. By this, a stable amount of penetration can be achieved. Since active heat conduction occurs at the contact portion between the closed section rib and the deck plate during welding, it is possible to suppress the melting of the closed section rib caused by the welding heat even when the welding temperature is increased. Therefore, there is an advantage in that the range of welding conditions can be enlarged.

In the above-described welding method, it is preferable that the dimension of the flat surface along the surface direction of the deck plate be 5 to 50% of the rib thickness (thickness of a plate forming the rib) of the closed section rib.

By controlling the dimension of the flat surface along the surface direction of the deck plate (in other words, the width of the flat surface in parallel to the surface direction of the deck plate) to be 5 to 50% of the rib thickness of the closed section rib, it is possible to set an appropriate value of the dimension of the flat surface in accordance with the rib thickness of the closed section rib. Where the dimension of the flat surface is smaller than 5% of the rib thickness, there is a possibility of melting occurring on the back surface side of the closed section rib. By controlling the dimension of the flat surface to be not smaller than 5%, it is possible to prevent the melting occurring on the back surface side of the closed section rib. Where the dimension of the flat surface is larger than 50% of the rib thickness, there is a possibility that the groove portion formed between the rib edge and the deck plate has a small size, thereby reducing the amount of penetration. By controlling the dimension of the flat surface to be not greater than 50% of the rib thickness, it is possible to ensure a high amount of penetration.

In the above-described welding method, it is preferable that the welding be performed such that the penetration of the welding covers a portion of the flat surface.

By performing the welding such that the penetration of the welding covers a portion of the flat surface, the groove portion formed between the rib edge and the deck plate is completely covered by the penetration of the welding. As a result, it is possible to eliminate molten slag and blowholes generated in the groove portion.

A steel plate deck according to the present invention comprises: a deck plate; a closed section rib that is provided on a surface of the deck plate and has a root portion at the edge of the rib, where the root portion has a flat surface that is in parallel with the surface of the deck plate and made to contact the surface of the deck plate; and a weld zone that fixes the closed section ribs to the deck plate.

According to the present invention, the closed section rib provided on the surface of the deck plate via the weld zone has a flat surface at the root portion at the rib edge, and the flat surface is made to contact the surface of the deck plate. Therefore, it is possible to provide a steel plate deck in which molten slag and blowholes hardly occur. By this constitution, it is possible to provide a steel plate deck having high static strength and high elastic strength.

In the above-described steel plate deck, it is preferable that the dimension of the flat surface along the surface direction of the deck plate be 5 to 50% of the rib thickness of the closed section rib.

According to the present invention, by controlling the dimension of the flat surface along the surface direction of the deck plate to be 5 to 50% of the rib thickness of the closed section rib, it is possible to set an appropriate value of the dimension of the flat surface in accordance with the rib thickness of the closed section rib. By controlling the dimension of the flat surface to be not smaller than 5%, it is possible to avoid melting occurring on the back surface side of the closed section rib. By controlling the dimensions of the flat surface to be not greater than 50% of the rib thickness, it is possible to ensure a high amount of penetration.

In the above-described steel plate deck, it is preferable that the weld zone covers a portion of the flat surface. Where the weld zone covers a portion of the flat surface, the groove formed between the rib edge and the deck plate is completely covered by the weld zone. By this constitution, it is possible to provide a steel plate deck which is free of molten slag and blowholes in the groove portion.

According to the present invention, the root portion at the rib edge of the closed section rib has a flat surface, and the deck plate and the closed section rib is welded in a state such that the flat surface of the closed section rib is made to contact the surface of the deck plate. Therefore, intrusion of molten slag and blowholes stops short of the contact portion, and the molten slag and blowholes are eliminated by the molten metal. By this constitution, it is possible to prevent the generation of residual slag and blowholes, ensuring a stable amount of penetration. In addition, since the amount of penetration can be controlled by controlling the dimension of the flat surface, it is possible to suppress any change in the amount of penetration caused by changes in the welding conditions. Therefore, it is possible to achieve a stable amount of penetration. Moreover, since heat conduction occurs actively at the contact portion between the closed section rib and the deck plate during welding, it is possible to suppress the melting of the closed section rib by the weld heat even when the welding is performed under high temperature conditions. Therefore, there is an advantage of providing a wide range of welding conditions.

DETAILED DESCRIPTION OF THE INVENTION

An embodiment of the present invention is explained below with reference to the drawings.

Figure 1:
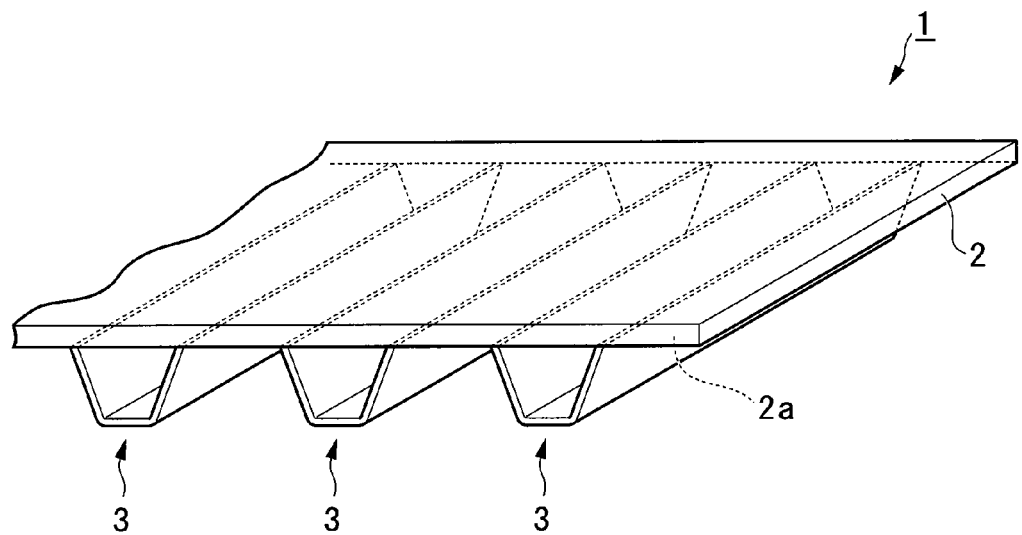
FIG. 1 is a drawing showing a steel plate deck according to an embodiment of the present invention.

FIG. 1 is a strabismus view showing a constitution of a steel plate deck 1 according to the present invention. As shown in the figure, the steel plate deck 1 is mainly constituted of a deck plate 2 and closed section ribs 3. The steel plate deck 1 is used as a floor member of a building structure, for example, a bridge.

The deck plate 2 is a rectangular plate member having a predetermined thickness and is made of steel.

A plurality of the closed section ribs 3 are provided on a surface 2a of the deck plate 2. Each closed section rib 3 is a shaped steel having a U-shaped section formed by bending a flat steel plate having a predetermined thickness. Each of the closed section ribs 3 elongates along a side of the deck plate 2, and in the direction perpendicular to the elongation direction, a plurality of the closed section ribs 3 are arranged with a predetermined pitch in between. The closed section ribs 3 are joined to the deck plate 2 by welding.

Figure 2:
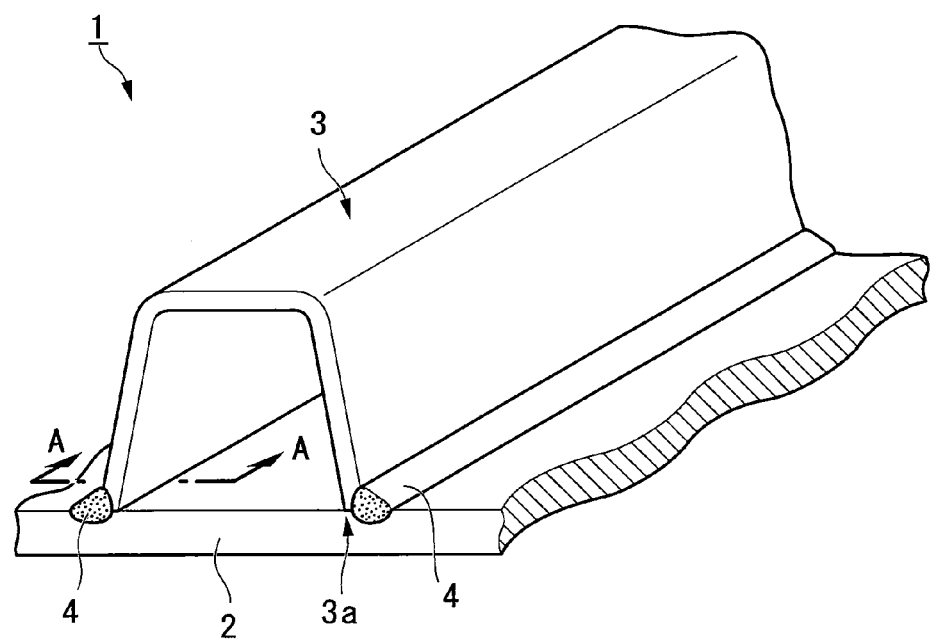
FIG. 2 is a drawing showing a constitution of a steel plate deck according to the present invention.

FIG. 2 is a strabismus view showing the constitution of the closed section rib 3 on the deck plate 2.

As shown in the figure, weld zones 4 are provided at the joint portions between the deck plate 2 and the closed section ribs 3. Each of the weld zones 4 is provided so as to cover the outside region of the U-shaped closed section rib 3 along a rib edge 3a. The weld zones 4 may be welded by using general welding consumables such as solid wire, fused flux, flux cored wire or the like.

Figure 3:
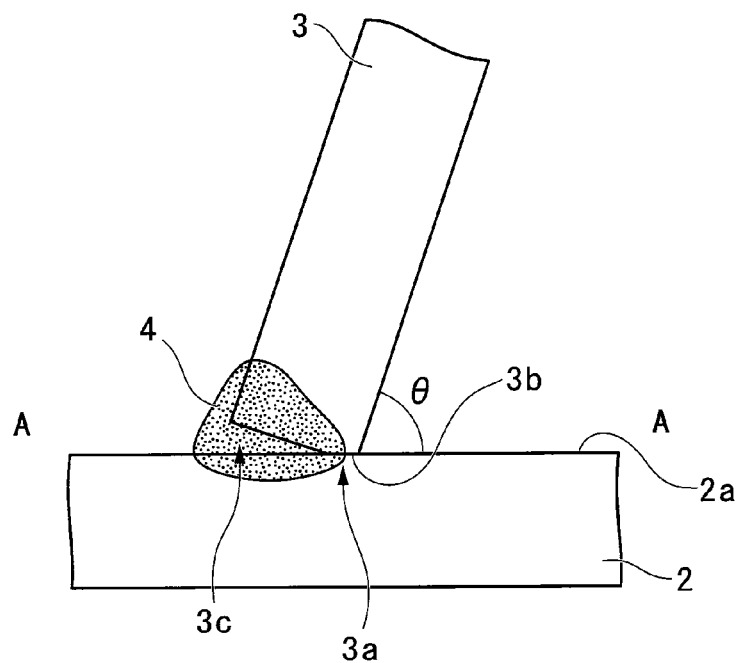
FIG. 3 is a drawing showing a constitution of a joint portion of a steel plate deck according to the present embodiment.

FIG. 3 is a drawing showing a constitution of a section of the steel plate deck 1 sectioned along A-A in FIG. 2. While the figure only shows one rib edge 3a of the closed section ribs 3, another 3a rib edge 3a has a similar constitution.

As shown in the figure, each rib edge 3a of the closed section rib 3 is connected to the surface 2a of the deck plate 2 forming a predetermined inclination angle (setting angle) θ. Preferably, the setting angle θ is set to be in the range of 65° to 85°. A flat surface (root face) 3b is provided at the root portion of the rib edge 3a. The root face 3b contacts the surface 2a of the deck plate 2. A portion of the rib edge 3a from the outer end to the end of the root face 3b does not contact the deck plate 2, forming a clearance (groove) 3c between the rib edge 3a and the deck plate 2. The weld zone 4 is provided so as to cover the entire portion of the groove 3c and a portion of the root face 3b.

Figure 4:
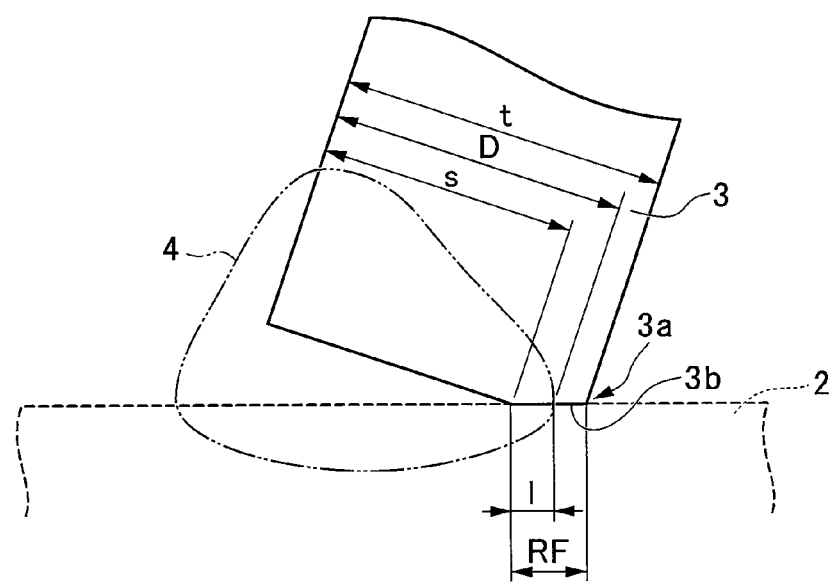
FIG. 4 is a drawing showing a constitution of a closed section rib according to the present embodiment.

FIG. 4 is a drawing showing a constitution of a portion (rib edge 3a) of the closed section rib 3.

As shown in the figure, the closed section rib 3 is constituted so as to have a plate thickness t of about 6 to 18 mm. A dimension RF of the root face is preferably set in the range of 0.05 to 0.5 times the plate thickness t of the rib (RF=0.05t to 0.5t), more preferably, in the range of 0.05 to 0.4 times the plate thickness t of the rib (RF=0.05t to 0.4t).

A dimension s of the groove 3c along the plate thickness of the rib is determined in accordance with the plate thickness t of the rib 3 and a target value of an amount of penetration. For example, where the plate thickness t of the rib 3 is about 12 mm, the dimension s of the groove 3c along the plate thickness direction of the rib 3 is about 7.5 mm, and the target amount D of penetration is set to be about 75% to 80% of the plate thickness t of the rib 3, a portion of the root face 3b where a weld zone 4 is formed has a dimension l in the range of about 1 mm to 1.5 mm. To ensure a stable amount D of penetration, the amount D of penetration may be controlled by controlling the dimension of the root face 3b.

Next a production method of a steel plate deck 1 having the above-described constitution is explained. The steel plate deck 1 is produced by welding the closed section ribs 3 to the deck plate.

Figure 5:
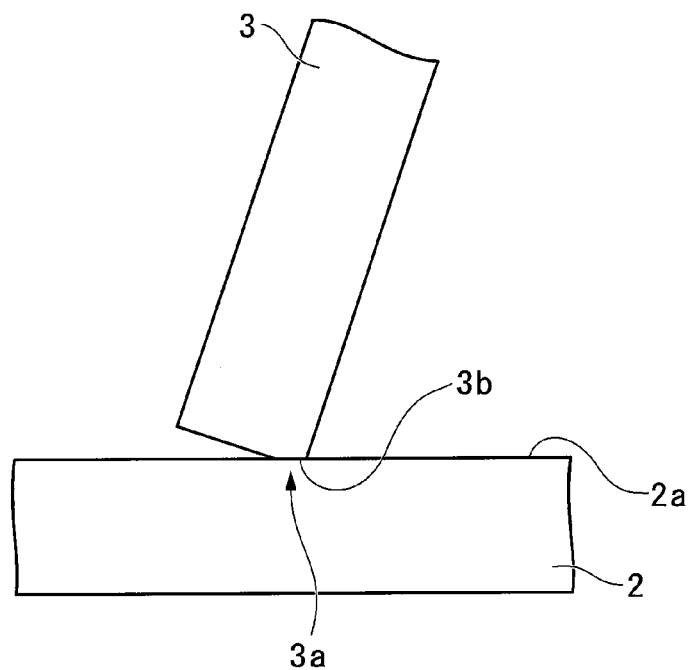
FIG. 5 is a drawing showing a welding process according to the present invention.
Figure 6:
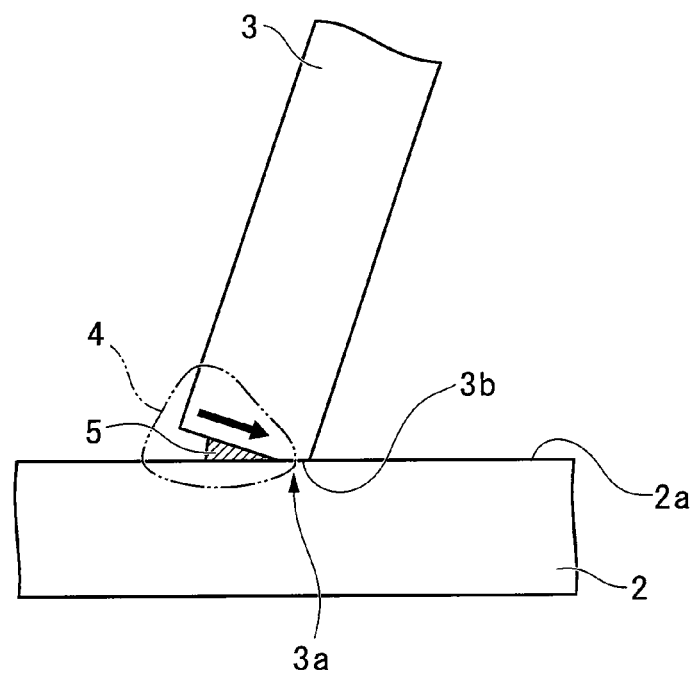
FIG. 6 is a drawing showing a welding process according to the present invention.

Firstly, as shown in FIG. 5, the root face 3b of the closed section rib 3 is made to contact the surface 2a of the deck plate 2. In this state, as shown in FIG. 5, welding is performed from the side of the groove 3c. As the method of welding, a general welding method such as submerged arc welding, gas-shielded metal arc welding or the like may be employed. The electric power supply for the welding may have a general characteristic such as DC constant voltage, DC drooping (constant current) characteristic, AC drooping characteristic, or the like.

Molten slag 5 and blowholes are generated during the welding. However, intrusion of the molten slag 5 and blowholes stops short of the root face 3b. Since the welding is performed from the groove 3c to a portion of the root face 3b, molten slag 5 and blowholes are eliminated by the molten metal during the process of the welding. During the welding, heat conduction occurs actively in the contact portion between the closed section rib 3 and the deck plate 2. Therefore, even when the heat input is increased, melting of the closed section ribs 3 caused by the welding heat is effectively inhibited.

Thus, according to the present embodiment, the root face 3b is provided at the root portion of the rib edge 3a of the closed section ribs 3, and the welding of the closed section ribs 3 to the deck plate 2 is performed in the state such that the root face 3b of the closed section ribs 3 is made to contact the surface 2a of the deck plate 2. Therefore, intrusion of the molten slag 5 and blowholes stops in short of the root face 3b, and the molten slag 5 and blowholes are eliminated by the molten metal. As a result, without increasing the amount of penetration, generation of molten slag 5 and blowholes is prevented, and a stable amount of penetration is ensured.

EXAMPLES

Test samples (SM490A and 1000 mm in length) were produced to have a various root faces as shown in Table 1, where the plate thickness t of a rib was in the range of 6 mm to 18 mm, and a setting angle θ was in the range of 65° to 85°. Each sample was subjected to evaluation using submerged arc welding and gas shielded metal arc welding.

TABLE 1

|  | Symbol | Rib plate thickness t (mm) | Setting angle θ (degree) | Root face RF (mm) | Root face/rib plate thickness RF/t (%) | Method of welding |
|---|---|---|---|---|---|---|
| Examples of the present invention | 1 | 6 | 85 | 0.5 | 8 | Submerged Arc welding |
|  | 2 | 6 | 65 | 3.0 | 50 |  |
|  | 3 | 12 | 65 | 0.5 | 4 |  |
|  | 4 | 12 | 75 | 2.0 | 17 |  |
|  | 5 | 12 | 65 | 5.5 | 46 |  |
|  | 6 | 12 | 75 | 6.5 | 54 |  |
|  | 7 | 18 | 85 | 3.5 | 19 |  |
|  | 8 | 18 | 65 | 6.5 | 36 |  |
|  | 9 | 18 | 75 | 10 | 56 |  |
|  | 10 | 12 | 75 | 2.5 | 21 | Gas-shielded metal arc welding |
| Comparative Example | 11 | 6 | 75 | 0 | 0 | Submerged Arc welding |
|  | 12 | 6 | 75 | 0 | 0 |  |
|  | 13 | 12 | 65 | 0 | 0 |  |
|  | 14 | 12 | 75 | 0 | 0 |  |
|  | 15 | 18 | 85 | 0 | 0 |  |

The submerged arc welding was performed by using a solid wire (JIS Z3351 YS-S6) and fused flux (JIS Z3352 FS-FP1). The gas-shielded metal arc welding was performed using a flux cored wire (JIS Z3313 YFW-C50DM). For each of the welding method and plate thickness of the rib, welding was performed using conditions shown in Table 2.

TABLE 2

| Welding method | Rib plate Thickness t (mm) | Power supply characteristic | Wire diameter (mmΦ) | Welding Current (A) | Arc voltage (V) | Welding Speed (cm/min) |
|---|---|---|---|---|---|---|
| Submerged arc welding | 6 | AC | 2.0 | 450 | 32 | 60 |
| | 12 | DC constant current | 3.2 | 650 | 32 | 55 |
| | 18 | DC constant current | 4.0 | 800 | 32 | 45 |
| Gas-shielded metal arc welding | 12 | DC constant current | 1.4 | 400 | 36 | 40 |

\* torch angle: 45°, wire extension: 25 mm,
\* Shielding gas: $CO_2$-25 l/min

The results of evaluation tests of the welding are summarized in Table 3. The amount D of penetration was determined as an averaged value obtained from three test pieces obtained from each sample after the welding for macroscopic observation. Absence or presence of slag inclusion was examined based on the observation of the above-described test pieces of macroscopic sections and observation of ruptured face s formed by cleaving the test pieces after cutting a V-notch in a surface of a bead of a weld zone of each of the test pieces. The absence or presence of blowholes was also examined based on the observation of the rupture faces.

Figure 9:
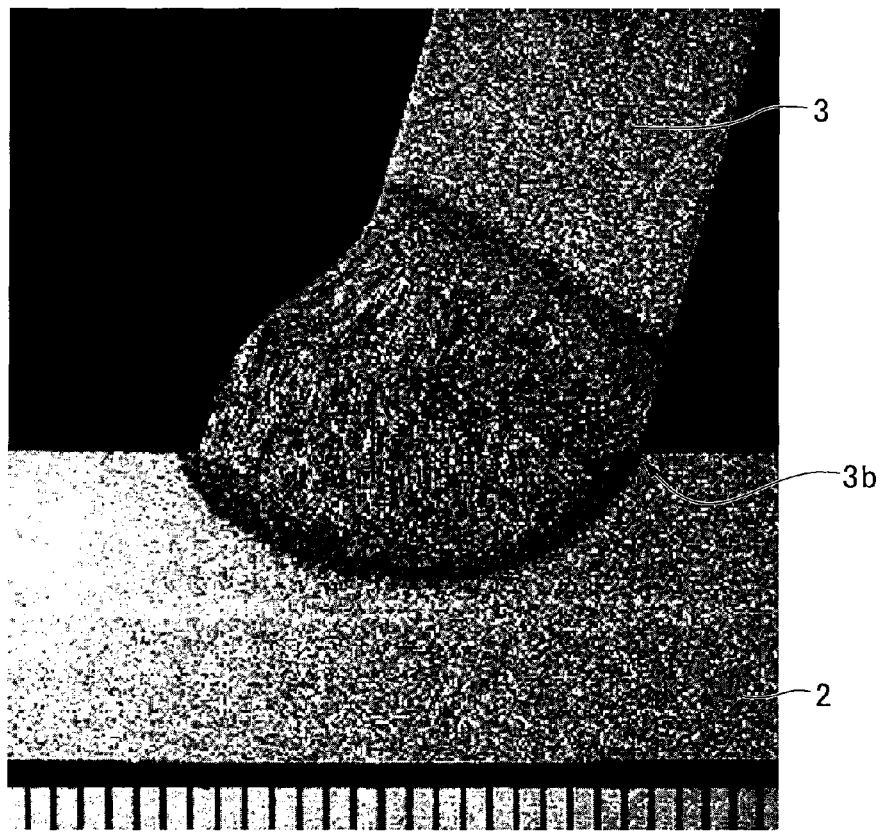
FIG. 9 is a photograph showing a contact portion of the steel plate deck according to the present invention.
Figure 10:
FIG. 10 is a drawing showing a ruptured face according to an example of the present invention.

As an example of the present invention, FIG. 9 shows a photograph of a macroscopic test piece of Example 4 for sectional observation. FIG. 10 shows a photograph of a ruptured face of the test piece.

Figure 7:
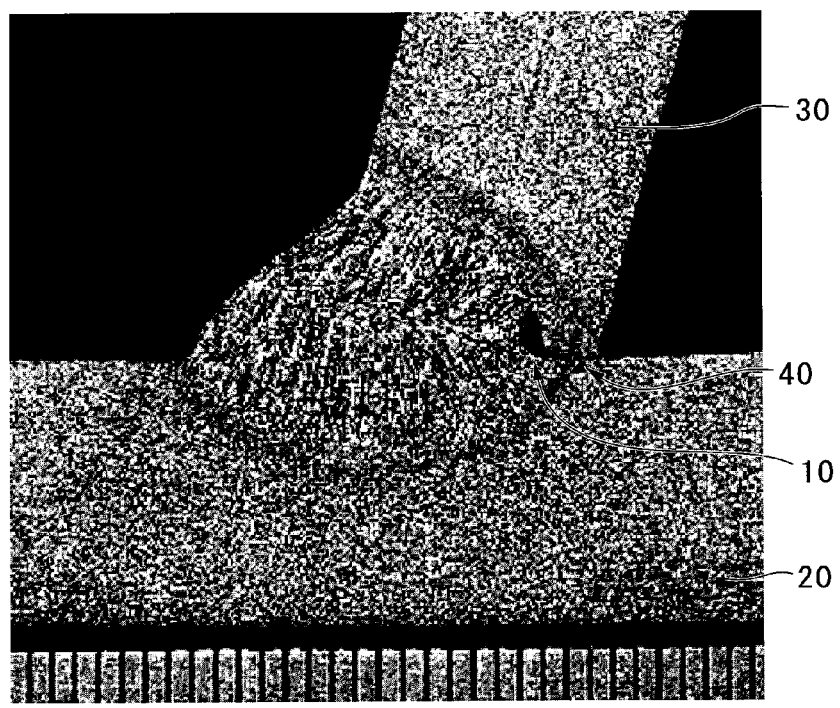
FIG. 7 is a photograph showing a joint portion of a steel plate deck according to the prior art.
Figure 8:
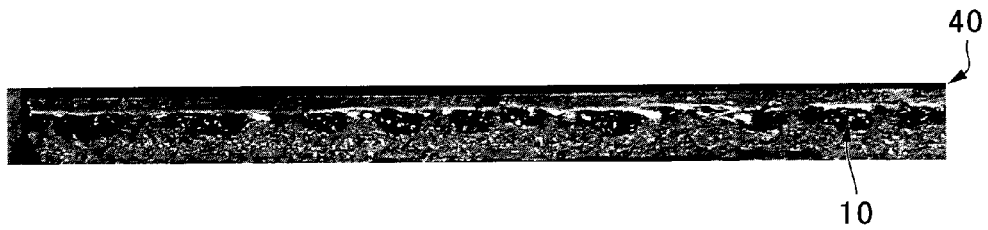
FIG. 8 is a photograph showing a ruptured face according to the prior art.

As a comparative example, FIG. 7 shows a photograph of a macroscopic test piece of Comparative Example 14 for sectional observation. FIG. 8 shows a photograph of a ruptured face of the test piece.

In Example 4, according to the present invention, slag inclusion was not observed. On the other hand, in Comparative Example 14, it was observed that slag inclusion 10 occurred in the time of forming the weld zone 40 by welding the deck plate 20 and the rib 30.

TABLE 3

| | Symbol | Depth of penetration (mm) | Penetration rate D/t (%) | Slag inclusion | Generation of blowholes | Burn through towards the back surface of the rib plate |
|---|---|---|---|---|---|---|
| Examples of the present invention | 1 | 5.5 | 92 | negative | negative | negative |
| | 2 | 4.5 | 75 | negative | negative | negative |
| | 3 | 11.6 | 97 | negative | negative | negative |
| | 4 | 10.5 | 88 | negative | negative | negative |
| | 5 | 8.6 | 72 | negative | negative | negative |
| | 6 | 8.0 | 67 | negative | negative | negative |
| | 7 | 14.6 | 81 | negative | negative | negative |
| | 8 | 13.7 | 76 | negative | negative | negative |
| | 9 | 11.6 | 64 | negative | negative | negative |
| | 10 | 9.8 | 82 | negative | negative | negative |
| Comparative Example | 11 | >6.0 | >100 | negative | negative | positive (seven/m) |
| | 12 | 5.4 | 90 | positive | positive | negative |
| | 13 | 11.8 | 98 | positive | negative | positive (2/m) |
| | 14 | 10.8 | 90 | positive | positive | negative |
| | 15 | 14.7 | 82 | positive | positive | negative |

Each of the Examples 1 to 10 according to the present invention exhibited satisfactory penetration where slag inclusion or generation of blowholes was not observed (negative) and burn through towards the back surface of the rib did not occur. Excluding Examples 3, 6, and 9, Examples according to the present invention demonstrated that a complete penetration was effectively prevented (penetration ratio was no greater than 95%) while ensuring deep penetration of a penetration ratio of not larger than 70%. In Comparative Examples 11 to 15, root faces were not provided to the rib edges. In Comparative Examples 11 and 13, burn through occurred by penetration reaching to the back surface of the plate of the rib. In Comparative Examples 12, 14, and 15, molten metal did not reach the molten slag that intruded into the root portions of the rib edges and slag inclusion occurred. Comparative Examples 12, 14, and 15 also showed an occurrence of blowholes.

As explained above, according to the present invention, molten slag and blowholes could be eliminated during the welding. Therefore, generation of residual molten slag and blowholes was inhibited and a stable amount of penetration could be achieved.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method of welding a deck plate and a closed section rib both constituting a steel plat, wherein
the deck plate is comprised of a steel plate having a first thickness;
the closed section rib is comprised of a steel plate having a second thickness, the rib comprising the steel plate thereof bent to define a rib, to define an edge of the steel plate forming the rib, and to define a root portion formed at the edge of the steel plate forming the rib;
the method comprising:
working the root portion of the closed section rib to have a flat surface in parallel with a surface of the deck plate, wherein a dimension of the flat surface along a surface direction of the steel plate deck is 5% to 50% of a thickness of the steel plate deck forming the closed section rib; and
welding the deck plate and the closed section rib while making the flat surface of the closed section rib be in contact with the surface of the steel deck plate.

2. A method of welding a deck plate and a closed section rib according to claim 1, wherein the welding is performed such that the penetration formed by the welding covers a portion of the flat surface.

3. A method of welding a deck plate and a closed section rib according to claim 1, wherein a setting angle between the steel plate forming the rib and the deck plate is in a range of 65° to 85°.

4. A method of welding a deck plate and a closed section rib according to claim 1, wherein the weld zone id formed by a single step welding by submerged arc welding or gas-shielded metal arc welding.

* * * * *